US010116452B2

(12) United States Patent
Giladi et al.

(10) Patent No.: US 10,116,452 B2
(45) Date of Patent: *Oct. 30, 2018

(54) SYSTEMS AND METHODS FOR SEGMENT INTEGRITY AND AUTHENTICITY FOR ADAPTIVE STREAMING

(71) Applicant: Futurewei Technologies, Inc., Plano, TX (US)

(72) Inventors: Alexander Giladi, Princeton, NJ (US); Xin Wang, Rancho Paolos Verdes, CA (US); Shaobo Zhang, Shenzhen (CN); Yongliang Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,834

(22) Filed: Mar. 8, 2017

(65) Prior Publication Data

US 2017/0180138 A1 Jun. 22, 2017

Related U.S. Application Data

(63) Continuation of application No. 13/870,890, filed on Apr. 25, 2013, now Pat. No. 9,635,004.

(Continued)

(51) Int. Cl.
*H04N 7/167* (2011.01)
*H04L 9/32* (2006.01)
*H04L 29/06* (2006.01)

(52) U.S. Cl.
CPC ........ *H04L 9/3247* (2013.01); *H04L 63/0428* (2013.01); *H04L 65/60* (2013.01)

(58) Field of Classification Search
CPC ... H04L 9/0643; H04L 9/3223; H04L 9/3236; H04L 9/3247

(Continued)

(56) References Cited

U.S. PATENT DOCUMENTS 5,734,819 A 3/1998 Lewis
6,009,116 A 12/1999 Gennaro et al.
(Continued)

FOREIGN PATENT DOCUMENTS

CN 101051906 A 10/2007
CN 101902477 A 12/2010
(Continued)

OTHER PUBLICATIONS

"Digital Video Broadcasting (DVB): Internet TV Content Delivery Study Mission Report (Public Version)," DVB Mission Report, Version 1.0.2, (tm4346), Nov. 2009, 80 pages.
(Continued)

*Primary Examiner* — Dant B Shaifer Harriman
(74) *Attorney, Agent, or Firm* — Slater Matsil, LLP

(57) ABSTRACT

System and method embodiments are provided for segment integrity and authenticity for adaptive streaming. In an embodiment, the method includes receiving at a data processing system a segment of a media stream, determining, with the data processing system, a digest or a digital signature for the segment, and comparing, with the data processing system, the digest/digital signature to a correct digest or a correct digital signature to determine whether the segment has been modified.

20 Claims, 8 Drawing Sheets

Related U.S. Application Data

(60) Provisional application No. 61/638,332, filed on Apr. 25, 2012.

(58) Field of Classification Search
USPC .......................................................... 380/200
See application file for complete search history.

(56) References Cited

U.S. PATENT DOCUMENTS

| | | | |
|---|---|---|---|
| 6,606,660 B1 | 8/2003 | Bowman-Amuah | |
| 6,959,384 B1* | 10/2005 | Serret-Avila | G06F 21/64 713/161 |
| 7,003,667 B1* | 2/2006 | Slick | G06F 21/608 380/243 |
| 7,082,255 B1* | 7/2006 | Jun | G06F 17/30793 348/E7.071 |
| 7,873,054 B2* | 1/2011 | Eswaran | H04L 45/745 370/351 |
| 9,628,487 B2* | 4/2017 | Wang | G06F 21/105 |
| 9,635,364 B2* | 4/2017 | Zhou | H04N 19/124 |
| 9,648,027 B2* | 5/2017 | Wang | H04L 63/123 |
| 9,794,240 B2* | 10/2017 | Liu | H04L 63/08 |
| 9,813,404 B2* | 11/2017 | Oyman | H04L 63/08 |
| 2002/0165912 A1 | 11/2002 | Wenocur et al. | |
| 2003/0007922 A1 | 1/2003 | Dodson | |
| 2003/0079222 A1 | 4/2003 | Boykin et al. | |
| 2003/0177381 A1 | 9/2003 | Ofek et al. | |
| 2005/0097361 A1 | 5/2005 | Apostolopoulos et al. | |
| 2005/0105474 A1 | 5/2005 | Metzler | |
| 2005/0281404 A1 | 12/2005 | Yu | |
| 2005/0283610 A1 | 12/2005 | Serret-Avila et al. | |
| 2006/0150055 A1 | 7/2006 | Quinard et al. | |
| 2007/0033235 A1* | 2/2007 | Kato | G06F 3/0622 |
| 2007/0130188 A1 | 6/2007 | Moon et al. | |
| 2008/0022012 A1 | 1/2008 | Wang | |
| 2009/0210707 A1 | 8/2009 | De Lutiis et al. | |
| 2010/0023815 A1* | 1/2010 | Hasegawa | G06F 21/64 714/57 |
| 2012/0042090 A1 | 2/2012 | Chen et al. | |
| 2012/0207175 A1 | 8/2012 | Raman et al. | |
| 2012/0259994 A1 | 10/2012 | Gillies et al. | |
| 2013/0125223 A1* | 5/2013 | Sorotokin | H04L 9/3213 726/6 |
| 2013/0215223 A1* | 8/2013 | Mochizuki | H04N 13/0048 348/43 |
| 2013/0291082 A1* | 10/2013 | Giladi | H04L 63/123 726/7 |
| 2014/0096271 A1* | 4/2014 | Wang | G06F 21/10 726/30 |
| 2014/0281556 A1* | 9/2014 | Mao | H04L 63/126 713/176 |
| 2014/0304515 A1* | 10/2014 | Feuerman | H04L 63/123 713/176 |
| 2015/0121484 A1* | 4/2015 | Liu | G06F 17/30887 726/5 |
| 2015/0271179 A1* | 9/2015 | Wang | H04L 63/10 726/30 |
| 2015/0350205 A1* | 12/2015 | Oyman | H04L 63/126 726/7 |
| 2016/0373462 A1* | 12/2016 | Wang | G06F 21/64 |
| 2017/0036526 A1* | 2/2017 | Horseman | B60K 5/1208 |
| 2017/0078199 A1* | 3/2017 | Mosko | H04L 45/7453 |
| 2017/0134356 A1* | 5/2017 | Oyman | H04L 63/08 |
| 2017/0180138 A1* | 6/2017 | Giladi | H04L 9/3247 |
| 2017/0195340 A1* | 7/2017 | Wang | H04L 63/108 |

FOREIGN PATENT DOCUMENTS

| | | |
|---|---|---|
| CN | 102143129 A | 8/2011 |
| JP | 09311854 A | 12/1997 |
| JP | 2001251296 A | 9/2001 |
| JP | 2007516660 A | 6/2007 |
| JP | 2009105633 A | 5/2009 |
| JP | 2012507940 A | 3/2012 |
| WO | 2005045653 A1 | 5/2005 |
| WO | 2010051169 A2 | 5/2010 |
| WO | 2011101371 A1 | 8/2011 |

OTHER PUBLICATIONS

Hirabayashi, M., "Existing Web Servers Realize Continuous Video Transmission," Invited Paper, Network Software Development Department, Technical Development Department, Sony Corporation, (With Translation), Mar. 2012, 28 pages.

"Information Technology—Dynamic Adaptive Streaming Over HTTP (DASH)—Part 1: Media Presentation Description and Segment Formats," International Standard, ISO/IEC 23009-1, First Edition, XP055112819, Apr. 1, 2012, 134 pages.

Lin, C.Y. et al., "Issues and Soutions for Authenticating MPEG Video," in: Proc. SPIE 3657, Security and Watermarking of Multimedia Contents, Photonics West, vol. 54, Apr. 9, 1999, 14 pages.

Sodagar, I. (Microsoft Corporation) and Veto, A. (Mitsubishi Electric Research Labs), "The MPEG-DASH Standard for Multimedia Streaming Over the Internet," Industry and Standards, 2001, 6 Pages.

* cited by examiner

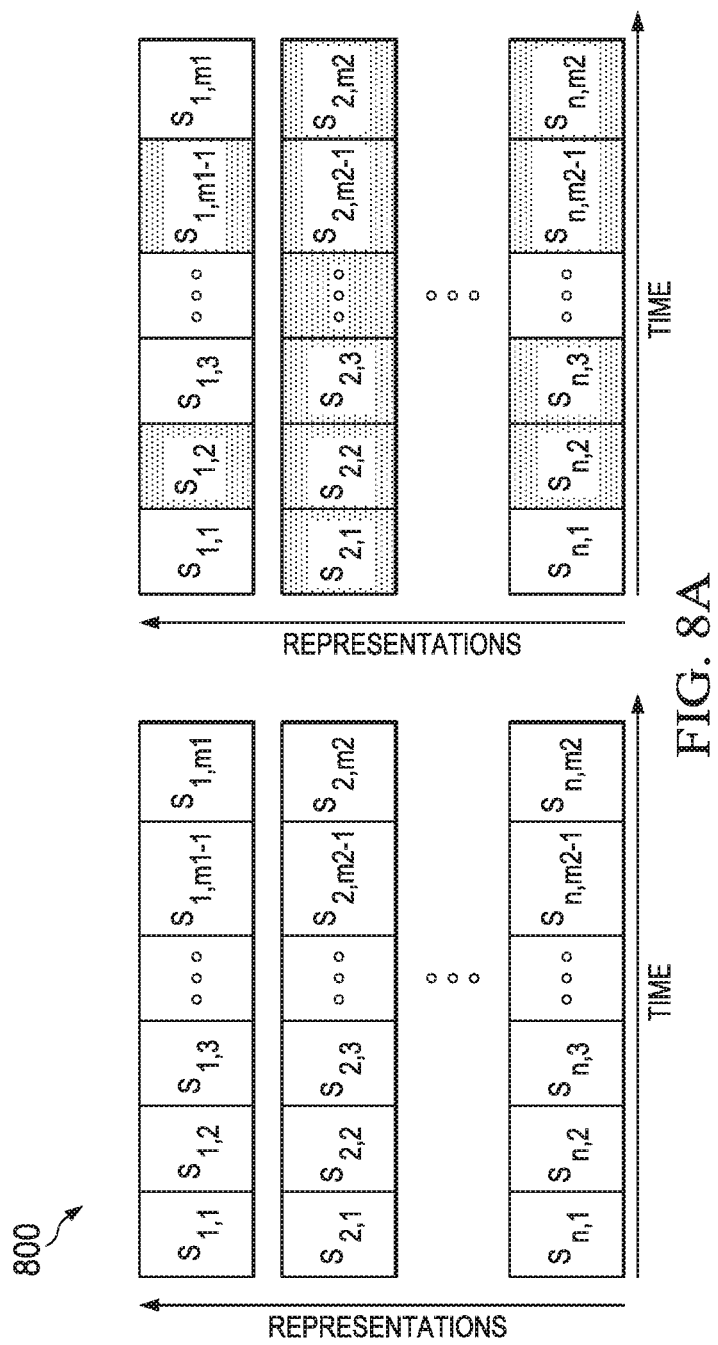

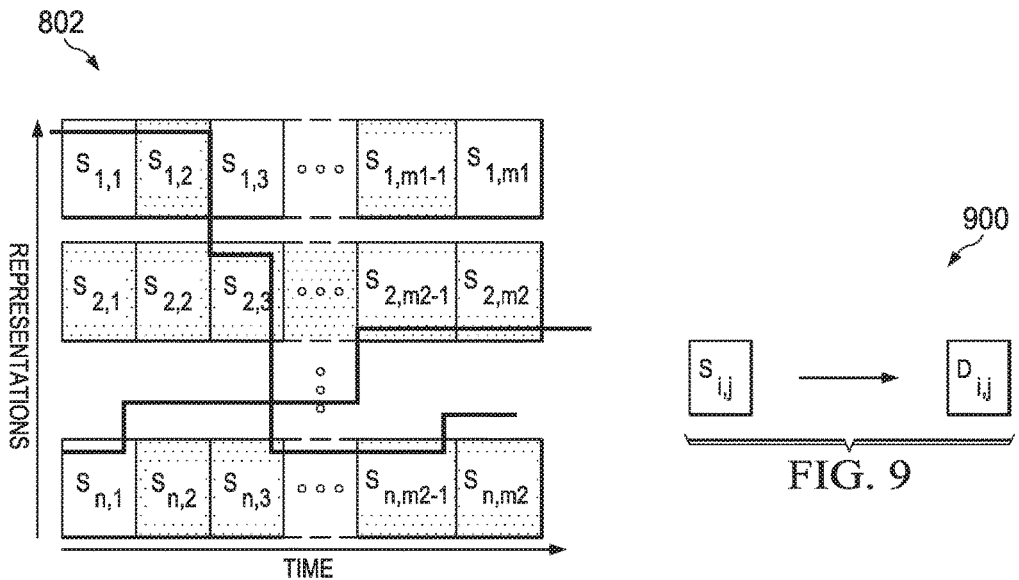
FIG. 8B
FIG. 9
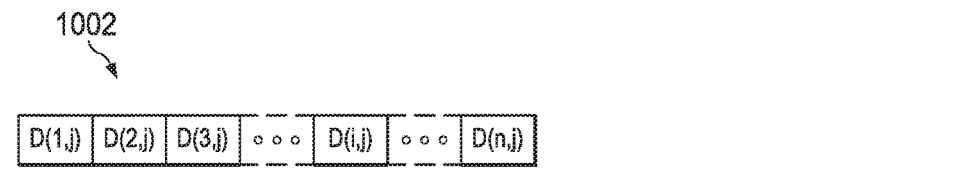
FIG. 10A
FIG. 10B
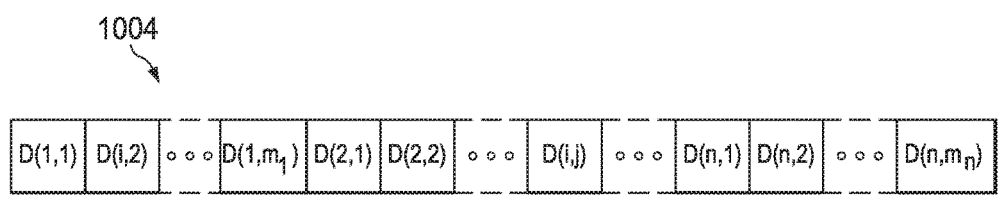
FIG. 10C

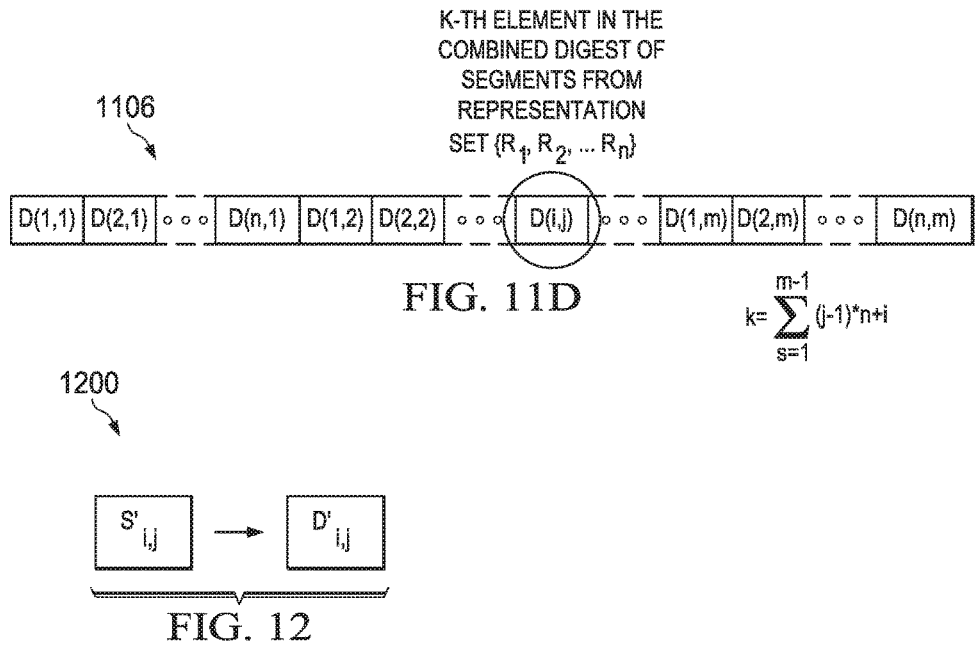
FIG. 11D
FIG. 12
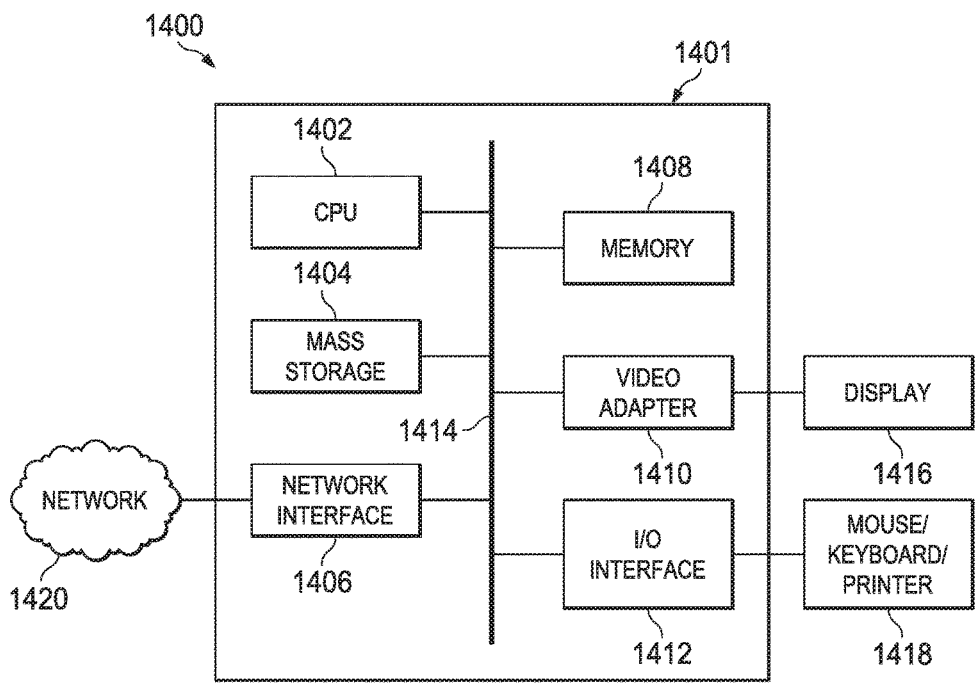
FIG. 14

SYSTEMS AND METHODS FOR SEGMENT INTEGRITY AND AUTHENTICITY FOR ADAPTIVE STREAMING

CROSS-REFERENCE TO RELATED APPLICATIONS

This application is a continuation of U.S. patent application Ser. No. 13/870,890 filed Apr. 25, 2013, titled "Systems and Methods for Segment Integrity and Authenticity for Adaptive Streaming," which claims the benefit of U.S. Provisional Patent Application No. 61/638,332 filed Apr. 25, 2012 and entitled "System and Method for Segment Integrity and Authenticity for Adaptive Streaming," which are incorporated herein by reference as if reproduced in their entirety.

TECHNICAL FIELD

The present invention relates to systems and methods for media streaming and, in particular embodiments, to systems and methods for segment integrity and authenticity for adaptive streaming.

BACKGROUND

In the walled garden of multiple system operator (MSO)-owned networks, an important security problem was prevention of unauthorized access and reproduction of high-value content. With the shift to open networks and Internet delivery, the operators no longer have complete end-to-end control over their delivery networks. This leads to several new attacks that, while not providing unauthorized access to content, allow disruption of service and unauthorized access to client devices.

Media segments and their descriptions (e.g., media presentation descriptions (MPDs)) are stored in various locations throughout their distribution network—they may be cached in nodes of a commercial content delivery network (CDN), then to nodes of possibly another CDN which is closer to the consumer, then, at a head-end of the service provider. In practice, some of those nodes may be malicious, in addition to the existence of potential tampering over the delivery channels between the nodes.

Firstly, an MPD may be changed by any malicious entity in this chain, thus completely hijacking a whole streaming session. This can be countered by either using a secure method of MPD delivery hypertext transfer protocol secure (HTTPS) and/or extensible markup language (XML) signature. Generally, for the purpose of this discussion assume that the client has the correct MPD and it was not tampered with, while the malicious entity has access to the MPD and has full access to the network as well.

Three main types of attack are considered: segment replacement, reordering, and modification. Complete denial of service to provide a segment (e.g., returning 404 instead of the segment) is always possible as well, but this can only be countered by providing several possible download locations and/or utilizing more than one CDN.

Straightforward content replacement or reordering is possible in three cases: when the requested segment is in the clear, when segments that are being replaced are consecutive, encrypted and placed in the same crypto-period, or when the intent is to disrupt the presentation, rather than substitute a segment with another playable one.

Examples of attacks are ad skipping (ads are replaced with the next segment from the movie), and service degradation (replacing high quality with low quality segments).

Generally the most vulnerable business model is when ad-supported digital rights management (DRM)-less content is provided, which is expected to be a fairly important model. The same threat generally affects public channels (such as C-SPAN in the U.S.), where content is transmitted unencrypted.

Segment modification is always possible in the clear and in any content using partial bitstream encryption. In the latter case encrypted bytes are signaled in unencrypted headers, so, for example, the actual protected elementary stream can be replaced with any arbitrary content in the clear. When the partially encrypted stream carries instructions that modify the client behavior in the clear, these can be used in order to modify the client behavior. In case of full segment encryption, segment modification will render a segment unplayable, possibly causing a decoder reset.

An example of such attacks (beyond plain replacement of encrypted content with other content in the clear) is adding 'lmsg' brand to ISO-FF segments in order to cause the client to quit a period early. Another interesting direction would be if there is a message containing the new MPD universal resource locator (URL) passed in the clear (though such functionality is currently not standardized); it is trivial to substitute this URL with a malicious one.

A malicious entity also may have access to keys that are used to encrypt and decrypt the content, when in-network transscrambling (e.g., re-encryption) is used. This way, content substitution is possible for encrypted content as well.

Similar attacks on non-media segments are also possible. In case of initialization and bitstream switching segments, modification can render the whole content completely or partially unplayable, while modified index files can at the least destabilize trick mode functionality.

Naïve segment modification is also possible, e.g., due to file corruption. Another naïve error that may be discovered this way is the use of an incorrect decryption key.

The discussion above only describes segments, however it is possible that a complete segment is never delivered, and bitstream switching is done at the subsegment level.

SUMMARY OF THE INVENTION

In accordance with an embodiment, a method for verifying segment integrity and authenticity for adaptive streaming includes receiving at a data processing system a segment of a media stream, determining, with the data processing system, a digest or a digital signature for the segment, and comparing, with the data processing system, the digest or the digital signature to a correct digest or a correct digital signature to determine whether the segment has been modified.

In accordance with another embodiment, a network component configured for verifying segment integrity and authenticity for adaptive streaming includes a processor and a computer readable storage medium storing programming for execution by the processor, the programming including instructions to: receive a segment of a media stream, determine a digest or a digital signature for the segment, and compare the digest or the digital signature to a correct digest or a correct digital signature to determine whether the segment has been modified.

In accordance with another embodiment, a method for verifying segment integrity and authenticity for adaptive streaming includes receiving, at a user equipment (UE), a segment of a media stream, wherein the media stream comprises a plurality of segments of a dynamic adaptive streaming over hypertext transfer protocol (DASH) stream, determining, with the UE, a digest or a digital signature for the segment of the media stream, comparing, with the UE, the digest or the digital signature to a correct digest or a correct digital signature, and determining, with the UE, whether the segment has been modified.

BRIEF DESCRIPTION OF THE DRAWINGS

For a more complete understanding of the present invention, and the advantages thereof, reference is now made to the following descriptions taken in conjunction with the accompanying drawing, in which:

FIGS. 8A-8B illustrate modification of content with segment replacement;

FIG. 9 illustrates digest generation;

FIGS. 10A-10C illustrate combined digests for representations;

FIGS. 11A-11D illustrate locating a digest for a retrieved segment in a combined digest;

FIG. 12 illustrates local digest/signature for a retrieved segment;

FIG. 14 is a processing system that can be used to implement various embodiments.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Traditionally, media content was protected from unauthorized access. In case of Internet streaming, additional threats related to tampering with media content have emerged. An embodiment proposes methods of verifying the integrity and authenticity of media content streamed with dynamic adaptive streaming over hypertext transfer protocol (HTTP) (DASH).

An embodiment uses digests to verify integrity and authenticity of adaptive streaming segments. An embodiment uses digital signatures to verify integrity and authenticity of adaptive streaming segments. An embodiment requests signatures and digests. An embodiment verifies integrity and authenticity of streamed content. An embodiment prevents or reduces malicious content manipulation within a network. Embodiments may be applied to ad-supported non-DRM adaptive streaming, secure adaptive streaming, and the like, in areas such as cable/IPTV/telecom/mobile/wireless/internet video streaming, CDNs, DASH, etc.

Figure 1:
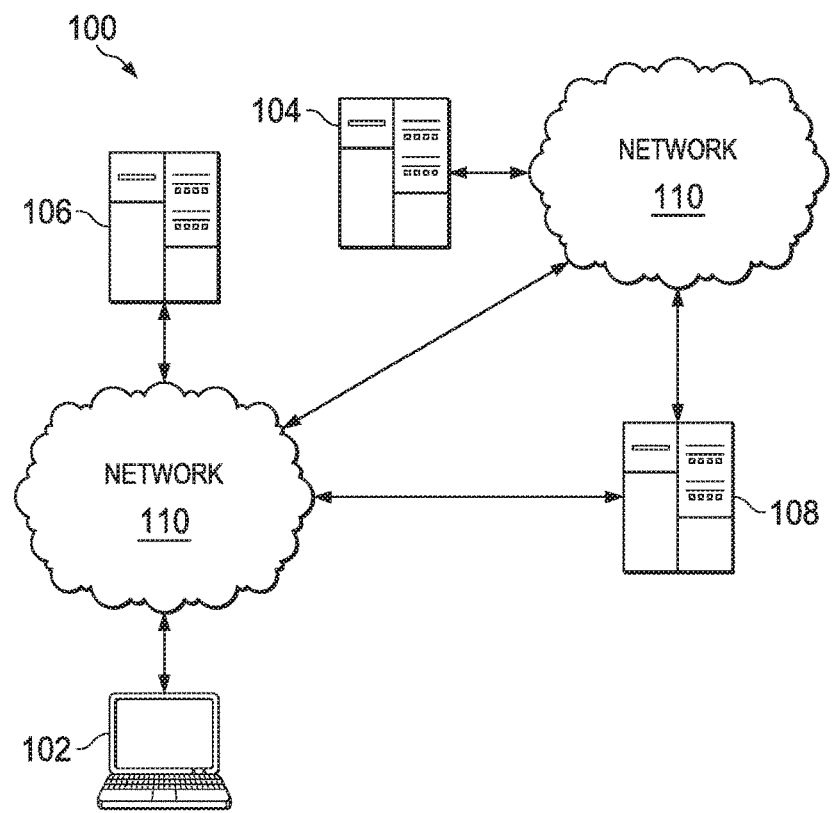
FIG. 1 illustrates an embodiment system for communicating data and maintaining segment integrity and authenticity for adaptive streaming.

FIG. 1 illustrates an embodiment system 100 for communicating data and maintaining segment integrity and authenticity for adaptive streaming. System 100 may include a client 102, a media source server 104, an authentication server 106, a malicious server 108, and a network 110. Network 110 may include switches, routers, communication channels, and other devices configured to transmit data from one part of the network 110 to another part of the network 110. The network 110 may include wired and wireless transmission means. The client 102, media source server 104, the authentication server 106, and the malicious server 108 are connected to the network 110 and configured to transmit and received data over the network 110. The client may be any type of user equipment (UE) including, for example, a personal computer, a laptop computer, a tablet computer, a smart phone, a personal digital assistant, etc.

Malicious server 108 is a server that may be in the transmission path of the media stream segments from media source server 104 to client 102. Malicious server 108 may attempt to modify or replace one or more segments of the media stream. For example, the malicious server 108 may replace the one or more segments of a different advertisement or include viruses or malware in a media segment in order to infect client 102 or to obtain private information from client 102.

The media source server 104 is configured to store media and transmit media streams to the client 102 via the network 110. The media streams may include media stream segments. The types of media may include video and audio. Each media stream segment may be encoded with information from which the client 102 may determine or calculate a digital signature. The digital signature may include a digest or a message authentication code. The media source server 104 may transmit the correct digital signatures for each segment to the authentication server 106 which may maintain a data store of the correct digital signature for each segment of the media stream. The authentication server 106 is a trusted authentication server or a trusted source that provides the correct digital signatures to the client 102 upon request from the client 102. The client 102 is configured to determine or calculate the digital signature of each segment and compare the determined digital signature to a correct digital signature received form the authentication server 106. If the two digital signatures match, then the segment has not been modified. However, if the two digital signatures do not match, then the client 102 determines that the segment has been modified and can discard the segment and/or request the media source server 104 to resend the modified segment. Modification of the segment may include replacement of the segment with a different segment, reordering the temporal placement of the segment in time with respect to other segments in the media stream, and/or modification of a part of or all of the segment. Modification of the segment may include insertion of malicious content that can damage the client 102 or reveal confidential user information stored on the client.

Both MPD and media segments may need to be legitimately changed in order to, e.g., perform dynamic ad insertion. Generally the only trusted element in the chain is the original content provider, or an entity explicitly trusted by the original content provider. Generally, there are four options to address this issue:
(1) have a trusted entity provide the client with a segment digest out of band via a secure channel;
(2) use an externally provided key to carry a MAC either in-band (in media or in index segments) or out of band (e.g. using HTTP);
(3) use of authenticated encryption, although this creates a new non-interoperable DRM, and does not keep compatibility with content encoded using full-segment, MPEG-2 CA, or CENC encryption; and
(4) use of HTTPS for all segment traffic, although this option significantly reduces scalability of the whole system.

Embodiments discussed below provide implementations of options 1 and 2 above, utilizing digital digests and signatures, which are transported out of bound.

Regarding a digest, some of the problems have been encountered, e.g., by Linux distributors and the file-sharing community, when malicious entities are trying to poison the network or simply inject virus-laden files. In these cases, an attack is trivially countered by using cryptographic hashes or digests. e.g., Ubuntu distributions provide MD5, secure hash algorithm (SHA)-1, SHA-256 and SHA-512 for downloaders with different degrees of paranoia.

The use of digests resolves the authenticity and integrity issues for the case where a secure channel (e.g. TLS) to a trusted entity is available to the client if it wishes to receive the digests. That is, given an n-th segment S(n) and a trusted entity that can provide the digest s=SHA(S(n)), the client can reject any invalid segment S' for S(n) if SHA(S')≠s.

As an example implementation, the MPD includes a SupplementaryProperty descriptor with a syntax similar to the one below:

```
<SupplementalProperty schemeIdUri="urn:mpeg:dash:sea:auth:2013">
    <sea:ContentAuthenticity
        authSchemeIdUri="urn:mpeg:dash:sea:sha256"
        authUrlTemplate= "https://verify.example.com?base=$base$&range=$first$-$last$" />
    </SupplementalProperty>
```

In case only a secure channel can be used, or there is a need to be cache-friendly, digital signatures can be used to provide a level of trust. Given a public key from a trusted entity, keyed hash message authentication code (HMAC) can be used in order to validate the message. In this case, both authenticity and integrity are guaranteed, while both the public key and the signature are transported in the clear. Same approach can be taken with the MPD itself by using XML signatures.

As an example, the MPD includes a SupplementaryProperty descriptor with a syntax similar to the one below:

```
<!-- SHA-256 digests is available for all (sub)segments -->
<SupplementalProperty schemeIdUri="urn:mpeg:dash:sea:auth:2013">
    <sea:ContentAuthenticity
        authSchemeIdUri="urn:mpeg:dash:sea:sha256"
        authUrlTemplate= "https://verify.example.com?base=$base$&range=$first$-$last$" />
    </SupplementalProperty>
```

An embodiment adds an additional URL template for requesting digest values of segments from a trusted entity. The digest values are computed for non-encrypted segments by the original content provider prior to encryption, if any, so that, in case segments are encrypted, the use of a wrong decryption key (which will result in an incorrectly decrypted segment) will be detected, and encryption keys will be completely decoupled from digests.

As SHA-1 is being deprecated, two hash functions that can be used are SHA-256 and SHA-512. SHA-256 requires less computational complexity on 32-bit machines (which are the vast majority of the ones used in mobile devices), so SHA-256 may be more useful in these machines.

HMAC can be supported within the same framework; the only significant change is receiving the public key.

In an embodiment, the following syntax and semantics can be used to support the content authentication framework described above:

| Element or Attribute Name | Use | Description |
|---|---|---|
| ContentAuthenticity | | Specifies information necessary to compute an authenticity tag for segment |
| @authSchemeIdUri | M | Specifies the algorithm used for computing the authenticity tag |
| @authUrlTemplate | M | Specifies the template for creating the URL used for retrieving the authenticity tag value. The rules for URL creation are specified in Error! Reference source not found.. |
| @authTagLength | O | Specifies the length of an authentication tag in bits. If absent, the tag length is same as in the algorithm identified by @authSchemeIdUri |

-continued

| Element or Attribute Name | Use | Description |
|---|---|---|
| @keyUrlTemplate | O | Specifies the template for key URI generation, using syntax and variable substitution as defined in ISO/IEC 23009-1: 2012, 5.3.9.4.4. |

Legend:
For attributes: M = Mandatory, O = Optional, OD = Optional with Default Value, CM = Conditionally Mandatory.
For elements: <minOccurs> . . . <maxOccurs> (N = unbounded) Elements are bold; attributes are non-bold and proceeded with an @.

For URL derivation, the digest and signature URL's are constructed as follows. A complete URL for a given media, initialization, index, or bitstream switching segment, or for a subsegment, is constructed. The same substitution variables as in ISO/IEC 23009-1 Annex E can be used for constructing the digest or signature URL templates. If digests are used, https should be used for requests.

| $<Identifier>$ | Substitution parameter |
| --- | --- |
| $$ | Is an escape sequence, i.e. "$$" is replaced with a single "$" |
| $base$ | The identifier shall be substituted by the scheme ":" hier-part of the original URL as defined in RFC3986. |
| $query$ | The identifier shall be substituted by the query part of the original URL as defined in RFC3986. If the query part of the original URL is empty then inclusion of this identifier in the template shall cause removal of the separator character immediately preceding the $query$ identifier in the template string if that character is not the "?" character, or, otherwise, the separator character immediately following the $query$ identifier if present. |
| $first$ | The identifier shall be substituted by the byte offset of the first byte in a range and shall be identical to the value of 'first-byte-pos' of 'byte-range-spec' in 14.35.1 of RFC2616, if this request would be executed using a partial GET request. If the URL does not contain a byte range, the value of $first$ shall be "0" |
| $last$ | The identifier is substituted by the byte offset of the last byte in the range; that is, the byte positions specified are inclusive. It shall be identical to the value of 'last-byte-pos' of 'byte-range-spec' in 14.35.1 of RFC2616, if this request would be executed using a partial GET request. If the URL does not contain a byte range, the value of $last$ shall be "Inf" |

Unlike ISO/IEC 23009-1 Annex E, in case byte ranges are not used, there are default values of variables $first$ and $last$. Byte range requests that do not correspond to segments or subsegments are not requested, and can be ignored by the server.

Figure 2:
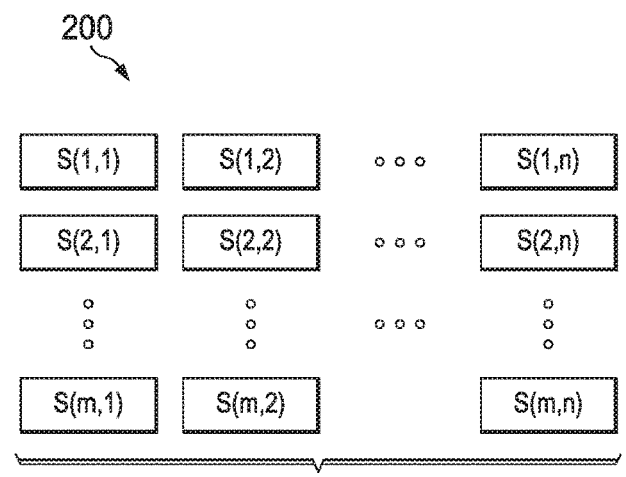
FIG. 2 illustrates an adaptation set of segments.

For positive numbers n and m, let a segment S be a sequence of bits (as a block of content), a representation $R=[S(1), S(2), \ldots, S(n)]$ be a sequence of n segments, and an adaptation set $A=[R(1), R(2), \ldots, R(m)]$ be a list of m representations. For simplicity, the j-th segment in the i-th representation, $A[i][j]$, is also denoted as $S(i, j)$, for $i=1, \ldots, m$ and $j=1, \ldots, n$. Visually, the adaptation set A can be treated as an m-by-n matrix of segments, as shown in FIG. 2, which is a diagram 200 illustrating an adaptation set of segments.

Figure 3:
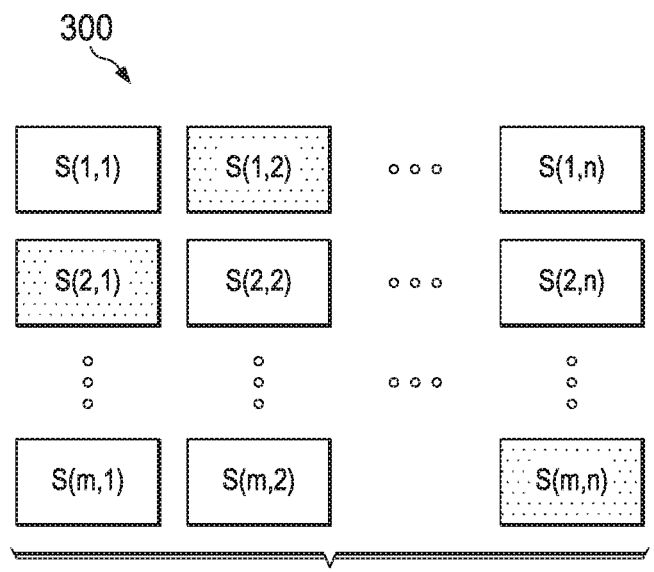
FIG. 3 illustrates an example of streams formed by segments.

A stream (of segments) defined by A is a sequence of n segments $[S(i_1, 1), S(i_2, 2), \ldots, S(i_m, n)]$, where $1 \leq i_k \leq m$ for $k=1, 2, \ldots, n$. A stream is called non-adaptive if $i_k=x$, where $1 \leq x \leq m$ for all $k=1, 2, \ldots, m$. In this case, a non-adaptive stream is just one of the representations in the adaptation set A. A stream is called adaptive if it is not non-adaptive. A stream is called smooth if the difference $|i_k-i_{k+1}| \leq 1$, for all $k=1, \ldots, n-1$. FIG. 3 is a diagram 300 illustrating an example of streams formed by shielded segments.

In a general setting, the server-client system architecture for dynamical adaptive streaming can be depicted in a multi-source and multi-sink diagram, where there are a number of nodes placed in between the servers and clients to provide CDN (content delivery network) functions for transporting content segments. Segments in the adaptation set A are initially available on the servers, but each server may not necessarily have all of the segments and any segment may be available more than one servers.

Figure 4:
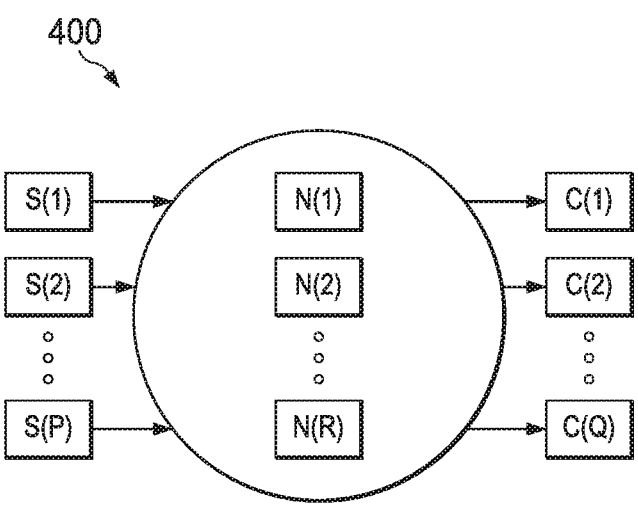
FIG. 4 illustrates an architecture for dynamic adaptive streaming.

FIG. 4 is a diagram 400 illustrating an architecture for dynamic adaptive streaming. A system of this architecture is a streaming one, if each client receives segments of any stream only one at a time according to their consecutive order in the stream, so the client can playback the segments in a time-progressive manner, soon after receiving them without waiting for receiving later segments. In a streaming system, any client always receives a prefix $[S(i_1, 1), S(i_2, 2), \ldots, S(i_k, k)]$ of a stream.

A streaming system is a dynamic adaptive one, if each client is capable of receiving non-representation streams.

Segments can be pushed by servers to clients or pulled by clients from servers, depending on segment transport protocols the system utilizes (e.g., http or real-time transport protocol (rtp)).

In an embodiment, it is desirable to ensure segments received by a client are not only forming a valid (and possibly intended) stream without any tampering on the integrity of the stream as a whole, but also authentic each individually, as originally available on the servers.

A few common attacks on the authenticity and integrity of a stream are:

(1) modifying content of a segment $S(i, j)$;
(2) removing or skipping one or more segments $S(i_j, j)$, $S(i_{j+1}, j+1), S(i_k, k)$, where $j<k$;
(3) replacing a segment $S(i, j)$ with another segment T not in the adaptation set A; and
(4) replacing a segment $S(i, j)$ with another segment $S(p, q)$ in the adaptation set A (reordering or recycling).

Those kinds of attacks may happen on the delivery channels and CDN nodes between the servers and clients.

In the digital security literature, hash functions are generally used to protect integrity of a sequence of digital bits. This is because performing direct comparison or checking between a received segment, or a received stream, with its original is practically infeasible or very inefficient. Instead, comparison or checking is done by pre-calculating a hash value of a segment and testing if the segment after being received has the same hash value.

Due to the nature of the structure of streams (which are sequences of segments), the integrity of a stream can be provided at the level of segment as well as the level of sequence of segments.

In a streaming system, a simplest, straightforward solution for integrity protection is to calculate hash values of all received segments. That is, considering the received segments as a longer concatenated sequence of bits, and checking if the following holds, for each $k=1, \ldots, n$:

$$H([S(i_1,1)|S(i_2,2)|\ldots|S(i_k,k)])=h^S_k.$$

This clearly involves too many redundant calculations, and requires too many (n×m$^n$) hash values $h^S_k$ to be pre-calculated, as there will be m$^n$ possible number of streams and each stream has n prefixes.

An improved version that utilizes the stream structure is to check integrity of each segment, and then the integrity of sequence of the segments in the stream. This leads to the following:

$$H(S(i_1,1))=h_{i1,1}, H(S(i_2,2))=h_{i2,2}, \ldots, H(S(i_k,k))=h_{ik,k} \text{ and}$$

$$H([h_{i1,1}|h_{i2,2}|\ldots|h_{ik,k}])=h^S_k.$$

Nevertheless, there are still a lot of (n×m$^n$) calculations for checking $h^S_k$.

If a dynamic adaptive streaming system has a trusted (third) party that can reliably provide hash values $h_{i,j}$ that are corresponding to segments S(i, j), then checking the integrity of received segments can be simply reduced to:

$$H(S(i_1,1))=h_{i1,1}, H(S(i_2,2))=h_{i2,2}, \ldots, H(S(i_k,k))=h_{ik,k}.$$

This is the most efficient one, in terms of calculation. This is because it only requires m×n pre-calculations for the m×n hash values, and m calculations for checking the integrity of a stream when it is implemented incrementally as the client receives the segments in time.

But the assumption that this trusted party can be independently contacted or communicated for providing those hash values may not be realistic in practice, as it will introduce extra communication transactions between clients and this trusted party. This leads to other offline and sideline solutions.

Offline solutions and sideline solutions rely on providing pre-calculated hash values to clients in either their entirety or some batch forms (as they become available), via channels possibly different from those for receiving segments, so the clients do not have to request and receive hash values from some online servers.

Figure 5:
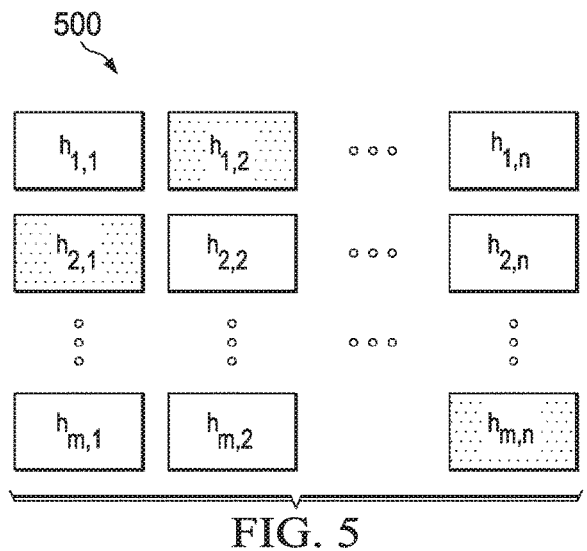
FIG. 5 illustrates a code book of hash values for an adaptation set.

If all segments are available before clients start to receive them (like in video on demand (VOD) cases), the hash values $h_{i,j}$ of all individual segments S(i, j) can be pre-calculated, and delivered to the clients as a "code book", depicted as in the following diagram, in one communication (again, possibly via a channel different from the channels they get segments). FIG. 5 is a diagram 500 illustrating a code book of hash values for an adaptation set A.

In this case, a client needs first to check the integrity of this "code book", and then to use it like the online case to check:

$$H(S(i_1,1))=h_{i1,1}, H(S(i_2,2))=h_{i2,2}, \ldots, H(S(i_k,k))=h_{ik,k}.$$

In many cases, not all segments are available way ahead of time for clients to receive them. Moreover, it is not pre-determined that a client will receive which stream, as a client may choose to receive segments of a stream in a dynamical manner according to its networking condition and resource availability. In those situations, hash values will only be calculated and provided to clients as their segments become available.

Figure 6:
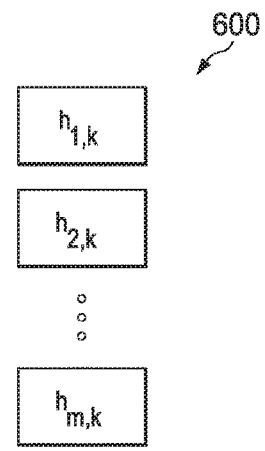
FIG. 6 illustrates a vector form of hash values.

In a simple live case, when a client receives a segment S($i_k$, k), all the segments (in the k-th column of A) S(i, k), i=1, 2, . . . , m, are available. This situation makes it possible to pre-calculate the hash values of these segments and deliver them to clients, in a "vector" form [$h_{1,k}, h_{2,k}, \ldots, h_{m,k}$]. FIG. 6 is a diagram 600 illustrating a vector form of hash values.

This way, at for any k, a client needs first to check the integrity of this k-th "vector", and then to use to check if $$H(S(i_k,k))=h_{ik,k}.$$

Sometimes, when a client receives a segment S($i_k$, k), it is not known if all the segments (in the k-th column of A) S(i, k), i=1, 2, . . . , m, are available. Even worse, it may not be known if all the segments (in the columns of 1 to k−1 of A) are available, except the ones, S($i_1$, 1), S($i_2$, 2), . . . , S($i_k$, k), that have been received by the client.

To accommodate those "non-uniform" cases, one can take an indexed list approach. This requires that when some segments S(i, k) become available, pre-calculating, $$h_{i,k}=H(S(i,k))$$

for all those available segments S(i, k), and preparing an indexed list {(i, k, $h_{i,k}$)} to send to clients. On the client side, upon receiving segment S($i_k$, k), the client can check if there is an entry ($i_k$, k, $k_{ik,k}$) in the received list, and if so, whether or not $$H(S(i_k,k))=h_{ik,k}.$$

Another approach to accommodate "non-uniform" cases is chaining-based. This approach requires that, when some segments S(i, k) become available, calculating not only the hash values $$h_{i,k}=H(S(i,k))$$

for all those available segments S(i, k), but also the hash values of any two "adjacent" segments that are available, $$g_{i,k,j}=H(h_{i,k}|h_{j,k-1}).$$

After this, two non-indexed lists, one for segment hash values {$h_{i,k}$} and the other for hash values of "adjacent" segments {$g_{i,k,j}$}, are prepared and delivered to clients. On the client side, upon receiving segment S($i_k$, k), the client can calculate its own hash value $$h=H(S(i_k,k))$$

and check if it is in the received list {$h_{i,k}$} for segment hash values. If so, the client further calculates the hash values of two "adjacent" segments S($i_{k-1}$, k−1)) and S($i_k$, k)), $$g=H(h_{ik,k}|h_{ik-1,k-1})$$

and checks if g is in the received list for hash values of "adjacent" segments {$g_{i,k,j}$}. If both checks are valid, then the integrity check for the received segment S($i_k$, k)) is satisfactory.

Generally, any approach to "non-uniform" live cases can be applied to "uniform" live cases. For instance, the indexed list approach is equivalent to the "vector" approach to the "uniform" live cases, as the indexed list {(i, k, $h_{i,k}$)} will include all (i, k, $h_{i,k}$) for i=1, 2, . . . , m, and become another representation of the vector [$h_{1,k}, h_{2,k}, \ldots, h_{m,k}$].

The chaining-based approach becomes the following, when employed to "uniform" live cases. For k=1, only one non-indexed list {$h_{i,1}$|i=1, . . . , m} for hash values of segments is prepared. For any k>1, two non-indexed lists, {$h_{i,k}$|i=1, . . . , m} and {$g_{i,k,j}$|i, j=1, . . . , m}, are prepared. Overall for the entire adaptation set A, this results in m×n hash value calculations, and additional m$^2$×(n−1) calculations of hash values for all pairings of consecutive segments.

When applying the chaining-based approach to smooth streaming systems for "uniform" live cases, the complexity can be reduced to a linear order O(m×n) of the size of the adaptation set A, as it requires m×n hash value calculations, and additional {2×2+(m−2)×3}×(n−1) calculations of hash values pairings of consecutive segments.

In the digital security literature, hash functions and digital signatures by trusted parties are generally used together to provide authenticity of a sequence of digital bits.

Figure 7A:
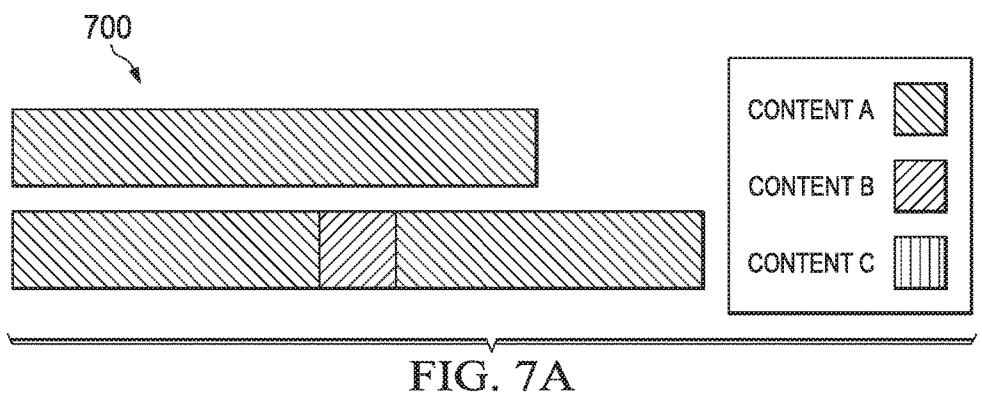
FIGS. 7A-7B illustrate advertisement insertion/replacement of segments.
Figure 7B:
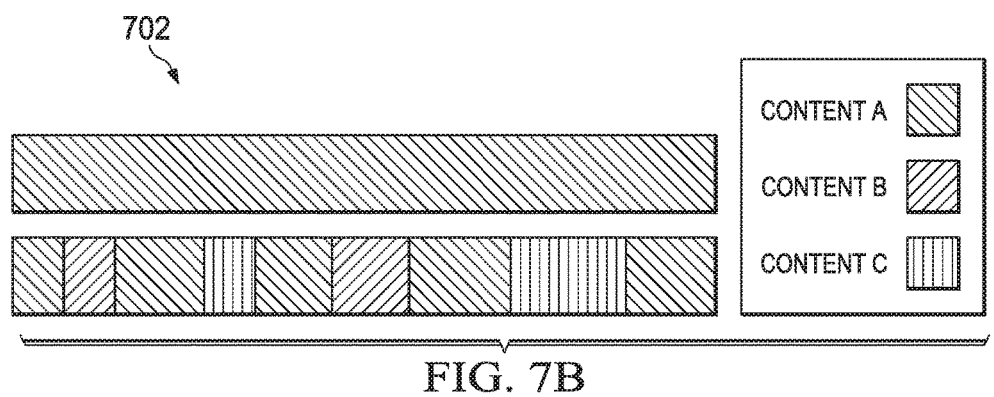

Content of a segment can be modified intentionally for some reason, e.g., business purpose or malicious attack. FIG. 7A is a diagram 700 illustrating an advertisement insertion, and FIG. 7B is a diagram 702 illustrating content replacement (which can be partial).

In DASH, there are multiple encoded version of the same content, and the possibility of insertion/replacement increases. FIG. 8A is a diagram 800 illustrating the modification of content with segments replacement in Representations (entire or partial replacement). This can happen in any intermediate node.

In case of DASH, in a temporal-Representation two dimension space, there can be partial replacement for some segments. Also, the switching path is unknown in advance, and different combinations are possible. This can be a combinatory problem, where the possibility increases exponentially with the number of representation and number of segments. FIG. 8b is a diagram 802 illustrating switching paths. Generally, given a segment, an entity should be able to judge whether it is modified, whether it is within the original set, and whether the temporal order is changed, all with a minimum of computation and redundancy as possible.

Authentication for a dynamic segment sequence includes generating a signature/digest for each segment, and concatenating the signature/digest in a certain order to form a message (combined signature/digest). For a segment, with its representation and time location, its corresponding signature/digest is extracted from the message. The digest is compared with a locally generated one for the segment to determine if the segment is modified in anyway (segment itself or temporal order).

FIG. 9 is a diagram 900 illustrating digest generation. $S_{i,j}$ denotes the j-th segment from Representation i. $D_{i,j}$ denotes the digest of segment $S_{i,j}$, which reflects the characteristic of $S_{i,j}$. The minimum number of bits of a digest $D_{i,j}$, denoted as B, can be determined by the number of representations, denoted as n: $B=2^{n+d}$, where d is an integer great than 0 to ensure the digest space is large enough to distinguish segment from N representations.

Assume the digest/signature is of fixed length, and they are concatenated in a certain order to form a combined digest for, e.g., a Representation (FIG. 10A), a group of time aligned segments from Representations (FIG. 10B) or a Representation Set (FIG. 10C). The combination can be in different orders in temporal-representation space: first time then representation, or first representation then time, as illustrated in FIGS. 10a-10c.

FIG. 10A is a diagram 1000 illustrating a combined digest for each Representation. Each representation is assigned a URL for its combined digest, for n representations, there are n URLs. Segment do not need to be aligned across representations, $n_i$ may not equal to $n_j$, if i≠j.

FIG. 10B is a diagram 1002 illustrating a combined digest 1002 for j-th segment from all representations. Each group of segments from representations is assigned a URL for its combined digest, and its available time is the same as that of the segments. Though only slightly different from FIG. 10A that combination is along representation order, it is advantageous to the live case where segments usually are time aligned across representations for easy switching, segments start at the same time are available in the same or near same time, so do their digest/signature.

FIG. 10C is a diagram 1004 illustrating a combined digest 1004 for a Representation set. A URL is assigned to a Representation set with n representations for its combined digest, it can be first in time order then in representation order (as shown in FIG. 10C) or in representation order first then in time order (not shown). Segment do not need to be aligned across representations, $n_i$ may not be equal to $n_j$, if i≠j.

Figure 11A:
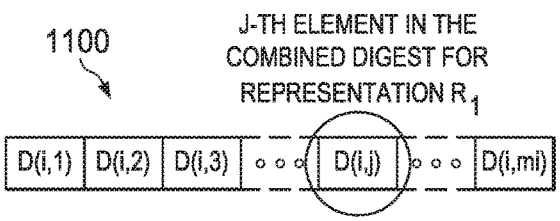
Figure 11B:
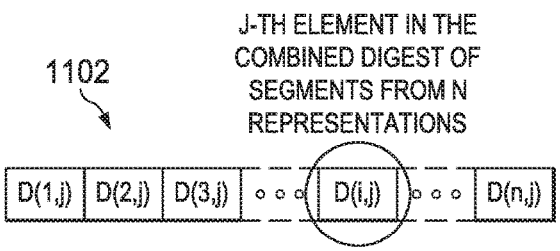
Figure 11C:
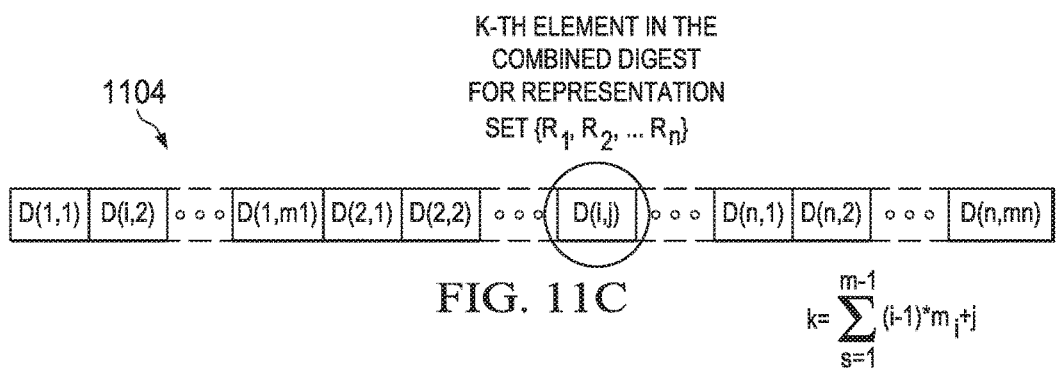

FIGS. 11A-11D are diagrams 1100, 1102, 1104, 1106 illustrating that, for a retrieved segment, with its index i and j, its digest can be located from the combined digest. Note that FIG. 11d is simplified case when segment are time aligned across representations (each representation contains the same number of segments).

FIG. 12 is a diagram 1200 illustrating generating a local digest/signature for a retrieved segment. In a comparison, if $S'_{i,j}=S_{i,j}$, the authentication passed. If not, the authentication failed.

An embodiment allocates a URL for a combined digest. The URL(s) for combined digest(s) is conveyed by MPD to signal where to retrieve the digest(s). The client retrieves the combined digest(s). The client extracts the digest for a specific segment. The client compares the extract digest with a locally generated one for the segment and makes conclusion.

An embodiment method for authentication for a dynamic segment sequence includes generating a signature/digest for each segment, and concatenating the signature/digest in a certain order to form a message (a combined signature/digest). For a segment, with its representation and time location, its corresponding part signature/digest is extracted from the message. The message is compared with a locally generated one for the segment to determine if the segment is modified in any way (set or temporal order). This method may be implemented on a sever/storage/client system.

An embodiment method for light-weight partial encryption includes generating a signature/digest for each segment and concatenating the signature/digest in a certain order (temporal-representation) to form a combined signature/digest. The method includes generating a signature/digest for a retrieved segment, named A. With the Representation and a time position of the segment, the method includes generating a mask to extract the corresponding part from the combined signature/digest, name B. The method compares A and B to determine if the segment is modified or not.

In a system/client method, a first party generates a message (with two-dimension information of segment) for a segment set. A second party uses the message to determine a segment retrieved is modified or not (both the set, temporal order are not changed).

An embodiment authenticates a dynamic sequence such that less communication is required (not for each segment). N combined digest/signature are fetched in case (a), while a single combined digest/signature is fetched in case (b). An embodiment authenticates a dynamic sequence with less computational complexity. An embodiment provides improved security enabling detection if media content has been modified whether segment is modified or the temporal order is changed.

Figure 13:
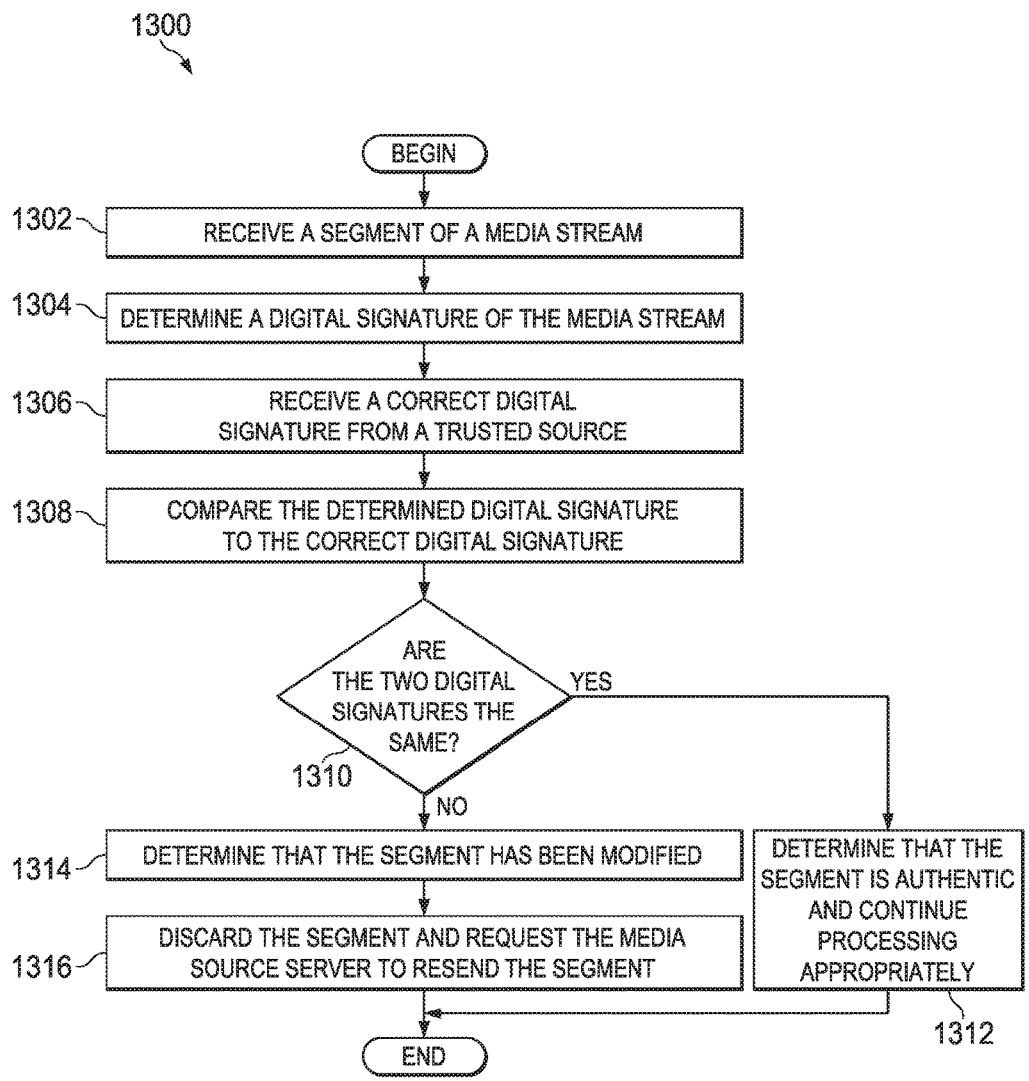
FIG. 13 is a flowchart of an embodiment method for verifying segment integrity and authenticity for adaptive streaming.

FIG. 13 is a flowchart of an embodiment method 1300 for verifying segment integrity and authenticity for adaptive streaming. The method 1300 begins at block 1302 where a client receives a segment of a media stream. At block 1304, the client determines a digital signature of the media stream. At block 1306, the client receives a correct digital signature for the received segment from a trusted source. At block 1308, the client compares the determined digital signature to the correct digital signature and, at block 1310 determines whether the two digital signatures are the same. If, at block 1310, the two digital signatures are the same, the method 1300 proceeds to block 1312 where the client determines that the segment is authentic and continues processing the segment appropriately, after which, the method 1300 may end. If, at block 1310, the client determines that the two digital signatures are not the same, then the method 1300 proceeds to block 1314, where the client determines that the segment has been modified. The method 1300 then proceeds to block 1316 where the client may discard the segment and request the media source server to resend the segment, after which, the method 1300 may end.

FIG. 14 is a block diagram of a processing system 1400 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1400 may include a processing unit 1401 equipped with one or more input/output devices, such as a speaker, microphone, mouse, touchscreen, keypad, keyboard, printer, display, and the like. The processing unit may include a central processing unit (CPU) 1402, memory 1408, a mass storage device 1404, a video adapter 1410, and an I/O interface 1412 connected to a bus 1414.

The bus 1414 may be one or more of any type of several bus architectures including a memory bus or memory controller, a peripheral bus, video bus, or the like. The CPU 1402 may include any type of electronic data processor. The memory 1408 may include any type of system memory such as static random access memory (SRAM), dynamic random access memory (DRAM), synchronous DRAM (SDRAM), read-only memory (ROM), a combination thereof, or the like. In an embodiment, the memory 1408 may include ROM for use at boot-up, and DRAM for program and data storage for use while executing programs.

The mass storage device 1404 may include any type of non-transitory computer readable storage medium or non-transitory storage device configured to store data, programs, and other information and to make the data, programs, and other information accessible via the bus 1414. The mass storage device 1404 may include, for example, one or more of a solid state drive, hard disk drive, a magnetic disk drive, an optical disk drive, or the like.

The video adapter 1410 and the I/O interface 1412 provide interfaces to couple external input and output devices to the processing unit 1401. As illustrated, examples of input and output devices include the display 1416 coupled to the video adapter 1410 and the mouse/keyboard/printer 1418 coupled to the I/O interface 1412. Other devices may be coupled to the processing unit 1401, and additional or fewer interface cards may be utilized. For example, a serial interface such as Universal Serial Bus (USB) (not shown) may be used to provide an interface for a printer.

The processing unit 1401 also includes one or more network interfaces 1406, which may include wired links, such as an Ethernet cable or the like, and/or wireless links to access nodes or different networks 1420. The network interface 1406 allows the processing unit 1401 to communicate with remote units via the networks 1420. For example, the network interface 1406 may provide wireless communication via one or more transmitters/transmit antennas and one or more receivers/receive antennas. In an embodiment, the processing unit 1401 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for verifying segment integrity and authenticity for adaptive streaming, the method comprising:

receiving, by a data processing system, a first representative segment of a media stream comprising a plurality of non-overlapping segments, each of the plurality of non-overlapping segments comprising multiple encoded representative segments of a same corresponding content;

receiving, by the data processing system, a first correct digest or a first correct digital signature for the first representative segment, the first correct digest or the first correct digital signature received through a first Uniform Resource Locator (URL) indicated in a media presentation description, and immediately comparing, after receiving the first representative segment, the first correct digest or the first correct digital signature to a first calculated digest or a first calculated digital signature of the first representative segment to determine whether the first representative segment has been modified;

receiving, by the data processing system, a second representative segment of the media stream, the second representative segment having a different encoding than the first representative segment, the first representative segment and the second representative segment being received one at a time in accordance with a consecutive order of the plurality of non-overlapping segments in the media stream; and receiving, by the data processing system, a second correct digest or a second correct digital signature for the second representative segment, the second correct digest or the second correct digital signature received through a second URL indicated in the media presentation description, and immediately comparing, after receiving the second representative segment, the second correct digest or the second correct digital signature to a second calculated digest or a second calculated digital signature of the second representative segment to determine whether the second representative segment has been modified.

2. The method of claim 1, wherein the first correct digest and the second correct digest or the first correct digital signature and the second correct digital signature are received from a server, wherein the server maintains a data store of correct digest values or correct digital signature values for each multiple encoded representative segment of the each of the plurality of non-overlapping segments.

3. The method of claim 1, wherein a segment modification comprises a change in a temporal order of a respective segment with respect to other segments in the media stream.

4. The method of claim 1, further comprising rejecting the first representative segment when the first calculated digest does not match the first correct digest or the first calculated digital signature does not match the first correct digital signature.

5. The method of claim 1, wherein each of the first calculated digest and the second calculated digest is a cryptographic hash.

6. The method of claim 1, wherein each of the first calculated digital signature and the second calculated digital signature is a message authentication code.

7. A network component configured for verifying segment integrity and authenticity for adaptive streaming, comprising:
a non-transitory memory storage comprising instructions; and
a processor in communication with the non-transitory memory storage, wherein the processor executes instructions to:
receive a first representative segment of a media stream comprising a plurality of non-overlapping segments, wherein each of the plurality of non-overlapping segments comprises multiple encoded representative segments of a same corresponding content;
receive a first correct digest or a first correct digital signature for the first representative segment, wherein the first correct digest or the first correct digital signature is obtained through a first Uniform Resource Locator (URL) indicated in a media presentation description, and wherein immediately, after receiving the first representative segment, the first correct digest or the first correct digital signature is compared to a first calculated digest or a first calculated digital signature of the first representative segment to determine whether the first representative segment has been modified;
receive a second representative segment of the media stream, wherein the second representative segment has a different encoding than the first representative segment, the first representative segment and the second representative segment being received one at a time in accordance with a consecutive order of the plurality of non-overlapping segments in the media stream; and
receive a second correct digest or a second correct digital signature for the second representative segment, wherein the second correct digest or the second correct digital signature is received through a second URL indicated in the media presentation description, and wherein immediately, after receiving the second representative segment, the second correct digest or the second correct digital signature is compared to a second calculated digest or a second calculated digital signature of the second representative segment to determine where the second representative segment has been modified.

8. The network component of claim 7, wherein the first correct digest and the second correct digest or the first correct digital signature and the second correct digital signature are received from a server, wherein the server maintains a data store of correct digest values or correct digital signature values for each multiple encoded representative segment of the each of the plurality of non-overlapping segments.

9. The network component of claim 7, wherein each of the first calculated digest and the second calculated digest comprise a message authentication code.

10. The network component of claim 7, wherein each of the first calculated digest and the second calculated digest comprise a cryptographic hash.

11. The network component of claim 7, wherein a segment modification comprises a change in a temporal order of a respective segment with respect to other segments in the media stream.

12. The network component of claim 7, wherein the processor executes instructions to reject the first representative segment when the first calculated digest does not match the first correct digest or the first calculated digital signature does not match the first correct digital signature.

13. The network component of claim 7, wherein each of the first calculated digital signature and the second calculated digital signature is a message authentication code.

14. A non-transitory computer-readable medium storing computer instructions for verifying segment integrity and authenticity for adaptive streaming, that when executed by one or more processors, cause the one or more processors to perform the steps of:
receiving, by a data processing system, a first representative segment of a media stream comprising a plurality of non-overlapping segments, wherein each of the plurality of non-overlapping segments comprises multiple encoded representative segments of a same corresponding content;
receiving, by the data processing system, a first correct digest or a first correct digital signature for the first representative segment, wherein the first correct digest or the first correct digital signature is obtained through a first Uniform Resource Locator (URL) indicated in a media presentation description, and wherein immediately, after receiving the first representative segment, the first correct digest or the first correct digital signature is compared to a first calculated digest or a first calculated digital signature of the first representative segment to determine whether the first representative segment has been modified;
receiving, by the data processing system, a second representative segment of the media stream, wherein the second representative segment has a different encoding than the first representative segment, the first representative segment and the second representative segment being received one at a time in accordance with a consecutive order of the plurality of non-overlapping segments in the media stream; and
receiving, by the data processing system, a second correct digest or a second correct digital signature for the second representative segment, the second correct digest or the second correct digital signature received through a second URL indicated in the media presentation description, and wherein immediately, after receiving the second representative segment, the second correct digest or the second correct digital signature is compared to a second calculated digest or a second calculated digital signature of the second representative segment to determine whether the second representative segment has been modified.

15. The non-transitory computer-readable medium of claim 14, wherein the first correct digest and the second correct digest or the first correct digital signature and the second correct digital signature are received from a server, wherein the server maintains a data store of correct digest values or correct digital signature values for each multiple representative segment of the each of the plurality of non-overlapping segments.

16. The non-transitory computer-readable medium of claim 14, wherein a segment modification comprises a change in a temporal order of a respective segment with respect to other segments in the media stream.

17. The non-transitory computer-readable medium of claim 14, further comprising rejecting the first representative segment of the plurality of non-overlapping segments when the first calculated digest does not match the first correct digest or the first calculated digital signature does not match the first correct digital signature.

18. The non-transitory computer-readable medium of claim 14, wherein each of the first calculated digest and the second calculated digest comprises a message authentication code.

19. The non-transitory computer-readable medium of claim 14, wherein each of the first calculated digest and the second calculated digest comprises a cryptographic hash.

20. The method of claim 1, wherein each of the first calculated digest and the second calculated digest is a message authentication code.

* * * * *